US 6,547,145 B2

(12) United States Patent
Colley et al.

(10) Patent No.: US 6,547,145 B2
(45) Date of Patent: *Apr. 15, 2003

(54) RESONANT MOTOR DRIVER SYSTEM FOR DATA READING

(75) Inventors: James E. Colley, Junction City, OR (US); Edward P. Coleman, Liverpool, NY (US)

(73) Assignee: PSC Scanning, Inc., Eugene, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/394,243

(22) Filed: Sep. 13, 1999

(65) Prior Publication Data

US 2003/0019937 A1 Jan. 30, 2003

Related U.S. Application Data (60) Provisional application No. 60/100,271, filed on Sep. 14, 1998.

(51) Int. Cl.$^7$ .................................................. G02B 5/08
(52) U.S. Cl. ............................. 235/462.36; 235/462.38; 359/199
(58) Field of Search ........................ 235/462.36, 462.38, 235/474, 476; 359/196, 197, 198, 199

(56) References Cited

U.S. PATENT DOCUMENTS 3,816,709 A * 6/1974 Walton .................... 235/439 X
5,003,164 A    3/1991 Barkan ................... 235/472.01
5,097,354 A * 3/1992 Goto .......................... 359/212
5,168,149 A * 12/1992 Devorkis et al. ....... 235/462.43
5,177,631 A * 1/1993 Orlicki et al. .............. 359/214
5,280,163 A    1/1994 Barkan ................... 235/462.32
5,329,103 A * 7/1994 Rando ..................... 235/462.36
5,629,510 A    5/1997 Quinn et al. ............ 235/462.36
5,694,237 A * 12/1997 Melville ..................... 359/214
5,742,042 A * 4/1998 Scofield ...................... 235/467
5,874,720 A    2/1999 Dvorkis et al. ......... 235/462.32
5,874,722 A    2/1999 Rando et al. ........... 235/472.01
6,118,569 A * 9/2000 Plesko ........................ 359/202
6,152,372 A * 11/2000 Colley et al. .......... 235/472.01

OTHER PUBLICATIONS

U.S. patent application Ser. No. 08/934,487, filed Sep. 19, 1997, entitled "Dithering Assemblies for Barcode Scanners," inventors: James Colley, James Ring, Patrick O'Donnell and Thomas Arends.

* cited by examiner

Primary Examiner—Diane I. Lee
(74) Attorney, Agent, or Firm—Stoel Rives LLP (57) ABSTRACT

A method for driving a resonant electromagnetically-actuated motor, such as those used to scan a light source for date reading applications, wherein drive current is applied when the back-EMF induced in the actuator coil is zero and has a specific slope, and that drive current is removed after the induced back-EMF voltage has changed by a predetermined constant value. The drive circuit will drive the motor across a scan angle which remains substantially constant regardless of changes in ambient temperature, changes in motor orientation, or externally applied forces.

43 Claims, 5 Drawing Sheets fig.1 fig.2 fig. 3 fig. 4

RESONANT MOTOR DRIVER SYSTEM FOR DATA READING

RELATED APPLICATION DATA

This application is claims priority to provisional application Ser. No. 60/100,271 filed Sep. 14, 1998.

BACKGROUND

The field of the present invention relates to optical systems for driving motors such as dithering or oscillating motor drive for producing a scanned beam in a data reading application.

Data reading devices, such as bar code scanners, read symbols such as those found on consumer and industrial products, including one-dimensional codes such as UPC code, EAN/JAN, Code 39 or two-dimensional codes such as PDF-417. Scanners may be stationary, handheld or combination stationary/handheld scanners. Typically a data reading device such as a bar code scanner illuminates a bar code and senses light reflected from the code to detect the bars and spaces of the code symbols and thereby derive the encoded data. In a common system, an optical beam of light, such as a laser beam produced by a laser diode is scanned over a scan angle so as to scan the laser spot across the item being read.

In applications requiring rapid scanning of an illumination beam, methods employed for rapidly and repetitively scanning the illumination beam across a scanned region include mirror dithering such as described in U.S. application Ser. No. 08/934,487 and light source dithering such as described in U.S. Pat. No. 5,629,510, both of which are hereby incorporated by reference. Dithering, i.e. rapid rotational oscillation of an illumination beam, causes the illumination beam to move rapidly back and forth generating a scan line. When this scan line illuminates a barcode, the resulting time dependent signal due to detected light scattered and/or reflected from the bars and spaces of the barcode is decoded to extract the information encoded therein.

Figure 1:
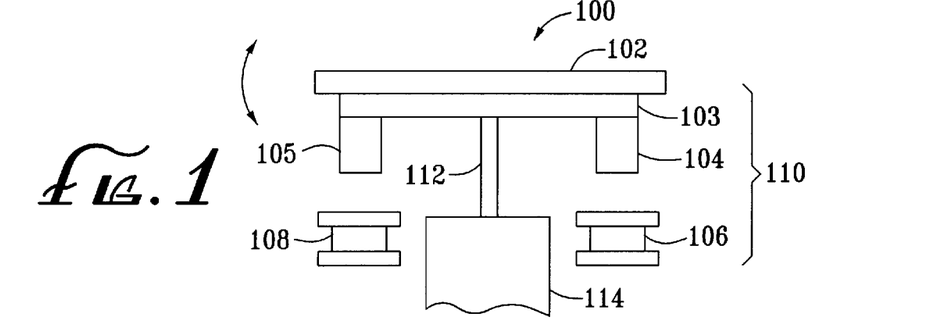
FIG. 1 is a top view of a dithering assembly employing a feedback magnet and coil for velocity feedback.

FIG. 1 illustrates a dithering assembly 100 comprising an oscillating structure which has a resonant frequency determined by the effective spring constant of bending member 112 and the effective mass of the mirror/magnet assembly 110 and any components attached thereto. The dithering assembly 100 comprises a mirror/magnet assembly 110, drive coil 106, feedback coil 108, bending member 112, and mounting member 114. The mirror/magnet assembly 110 comprises mirror 102, mirror bracket 103, drive magnet 104 and feedback magnet 105. The drive coil 106, feedback coil 108 and mounting member 114 may be part of or mounted within a housing (not shown) for dithering assembly 100. The bracket 103 holds mirror 102 and is connected to mounting member 114 by bending member 112, which may comprise a thin, flat sheet of flexible material which acts as a bendable spring.

Bending of member 112 results in pivoting/rotation of mirror/magnet assembly 110 about an axis substantially parallel to mirror 102, perpendicular to the plane of FIG. 1. The motion of mirror/magnet assembly 110 is driven by passing an oscillating drive current through drive coil 106 thereby generating an oscillating magnetic driving force on drive magnet 104. The maximum amplitude of dithering motion of the mirror 102 occurs when the drive current oscillates at the resonant frequency of dithering assembly 100, i.e., when the dithering assembly 100 is driven resonantly. It is important to drive the dithering assembly 100 resonantly to obtain the maximum dithering amplitude with minimum drive power consumption. It is also important that the position and length of the resulting scan line remain constant.

A feedback coil 108 positioned adjacent the mirror bracket 103 experiences an oscillating magnetic field due to motion of the feedback magnet 105, which is attached to bracket 103. The electrical potential developed across feedback coil 108 varies directly with time derivative of the magnetic flux at feedback coil 108, and hence with the velocity of feedback magnet 105 and dithering mirror 102. The zero crossings of the feedback potential, which occur when the mirror velocity is zero, are used to trigger switching of the polarity of the drive current in drive coil 106, thereby reversing the drive force exerted on drive magnet 104 and mirror 102. In this manner, the switching frequency of the drive force matches the resonant the frequency of the dithering motion of dithering assembly 100 and the drive force is in phase with the velocity for a resonantly driven system.

It is also possible to derive velocity feedback from a fixed Hall Effect sensor mounted adjacent a moving magnet, or from a piezoelectric element attached to the flexure such as disclosed in U.S. application Ser. No. 08/934,487.

There are several disadvantages with these feedback schemes such as requiring additional sensing hardware and control electronics, which add to the overall power consumption, cost, and/or complexity of the scanning system.

SUMMARY OF THE INVENTION

The present invention is directed to systems and methods for driving motors, such as those motors used to dither scan mechanisms in a scan module or scanning assemblies therefore. A preferred embodiment is directed to a resonantly driven dithering assembly employing feedback such as for scanning an illumination beam for a barcode scanner in which the velocity feedback signal is derived from the back-EMF of the actuator motor coil. The drive current is pulsed for a given duration commencing at a start point where the velocity of the dither mechanism is measured to be zero.

DETAILED DESCRIPTION OF PREFERRED EMBODIMENTS

Preferred embodiments will now be described with reference to the drawings. For clarity of description, any element numeral in one figure will represent the same element if used in any other figure.

Figure 2:
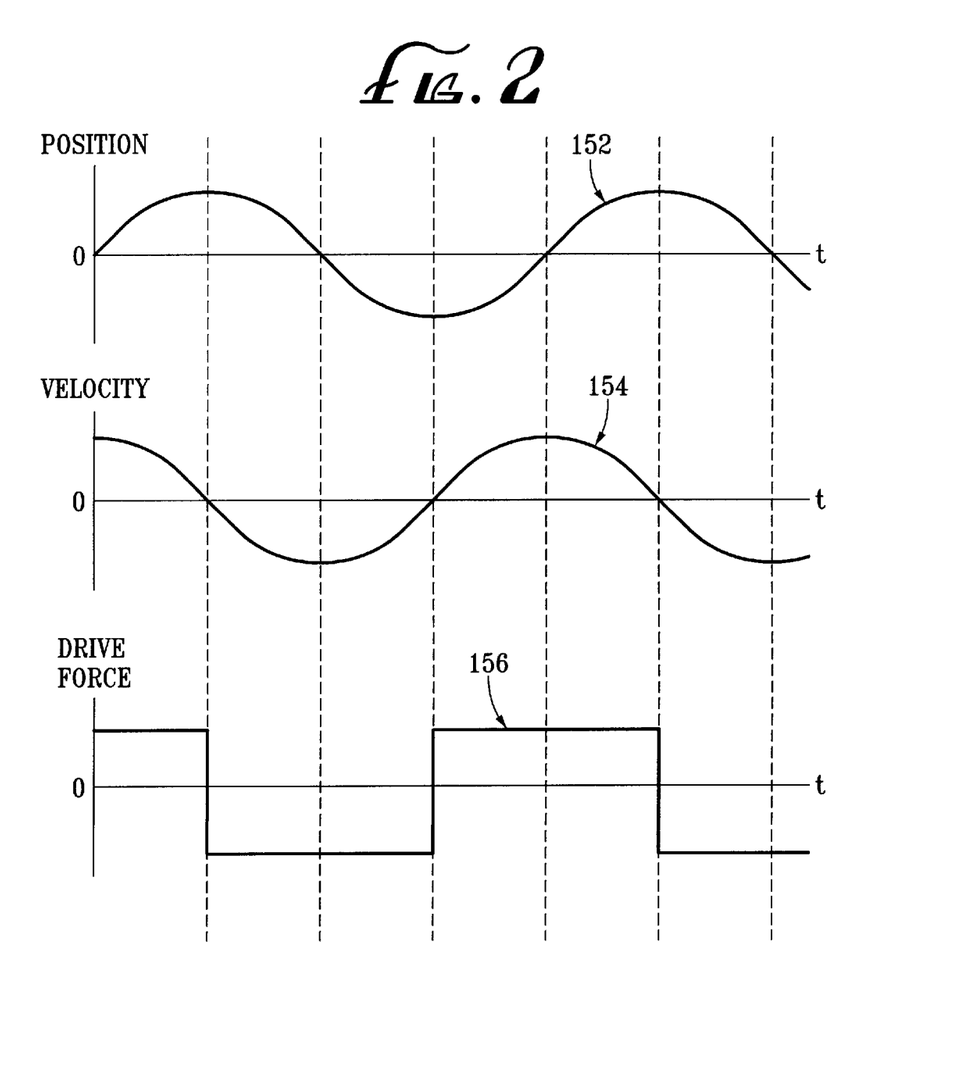
FIG. 2 illustrates waveforms for the position, velocity, and drive force for a resonantly driven dithering assembly.

FIG. 2 illustrates typical waveforms for position, velocity, and drive force for a resonantly driven dithering assembly. Position waveform 152 and velocity waveform 154 are substantially sinusoidal, with a phase shift of 90 degrees between the position and the velocity. For a dithering assembly driven at its resonant frequency, velocity waveform 154 will be in phase with drive force waveform 156. Drive force waveform 156 is shown as a square wave in FIG. 2, but may also comprise a substantially sinusoidal waveform. The drive force may be applied continuously as shown, or a unipolar driver may be used which supplies current in one direction only, for some portion of the cycle.

Velocity feedback may be employed to implement resonant-frequency drive. Feedback coil 108 experiences an oscillating magnetic field due to feedback magnet 105, which is attached to bracket 103. The electrical potential developed across feedback coil 108 varies directly with time derivative of the magnetic flux at feedback coil 108, and hence with the velocity of feedback magnet 105 and dithering mirror 102. The zero crossings of the feedback potential, which occur when the mirror velocity is zero, are used to trigger switching of the polarity of the drive current in drive coil 106, thereby reversing the drive force exerted on drive magnet 104 and mirror 102. In this manner, the switching frequency of the drive force is always locked to the frequency of the dithering motion of dithering assembly 100 and the drive force is in phase with the velocity as required for a resonantly driven system.

Figure 3:
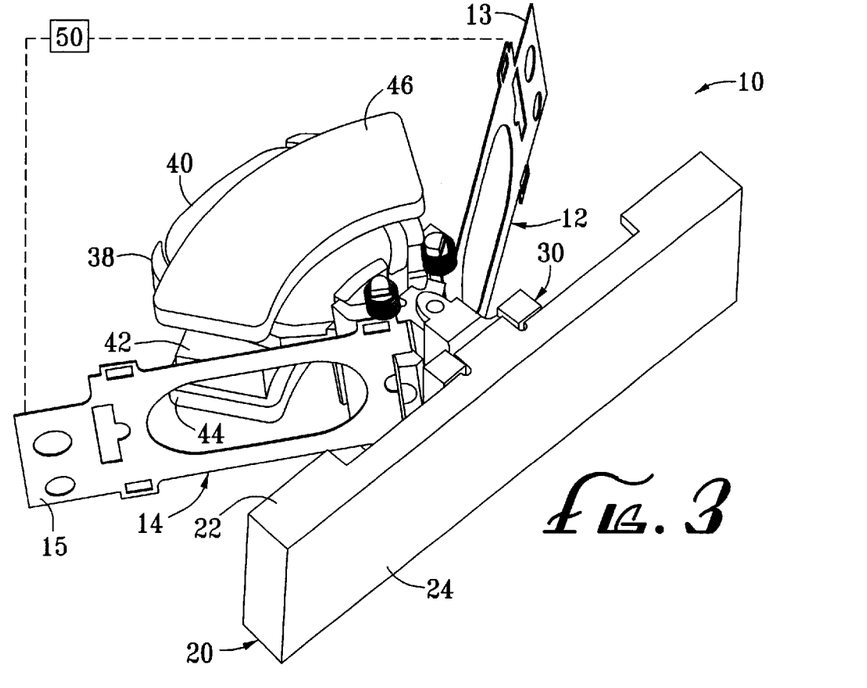
FIGS. 3–4 are perspective views of a preferred dither drive mechanism for control by a preferred embodiment of the present invention.
Figure 4:
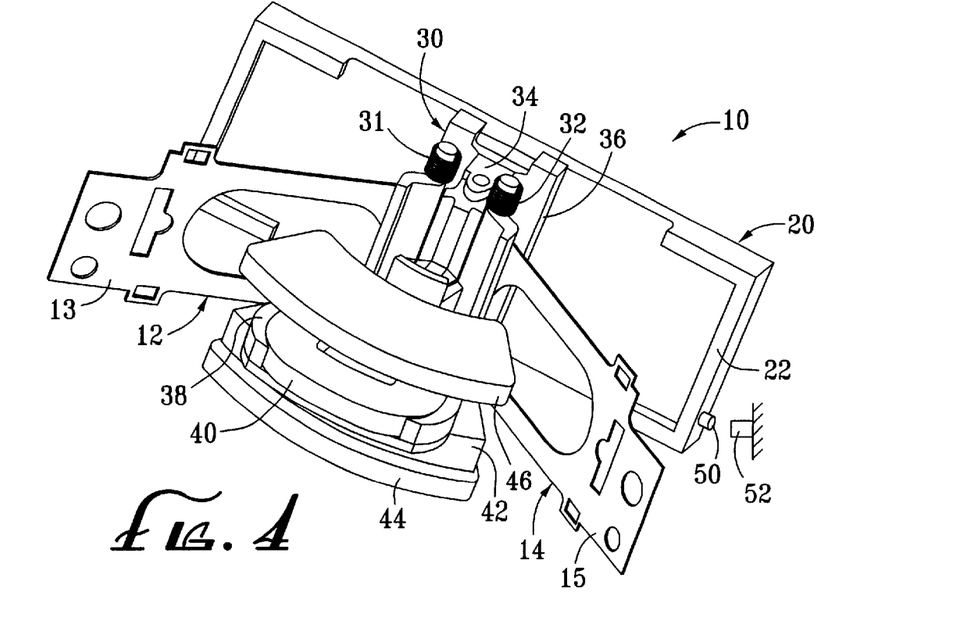

FIGS. 3–4 illustrate a preferred dither drive configuration. In the dither drive system 10, the scan mechanism comprises a mirror assembly 20 comprised of a mirror mount 22 and a mirror surface 24. In a preferred construction, the mirror assembly 20 comprises a one-piece molded plastic part with a gold-plated mirror surface 24. The mirror mount 22 is mounted to mount end 36 of a pivoting support element 30. The support 30 connects the moving mirror to the flexures or springs 12, 14 allowing the support 30 to pivot thereby providing the scanning motion for the light beam directed onto the mirror 24. The flexures 12, 14 form a "V" shaped structure supported at opposite ends 13, 15 by fixed supports (not shown). The flexures 12, 14 are separate elements made of or including conductive material, such as beryllium copper, to provide electrical connection via wire 31 (attached to flexure 12) and wire 32 (attached to flexure 14). The wires 31, 32 provide the two electrical connections to the drive coil 40. The drive coil 40 is mounted to the rear end 38 of the support 30. The drive coil 40 is disposed adjacent to a pair of permanent magnets 42, where the entire magnetic field assembly (of the magnet 42 and coil 40) is contained by keepers 44, 46 disposed above and below the magnetic drive elements 40, 42.

Drive current from controller 50 passes through the flexures 12, 14 to the coil 40 at a desired frequency creating a magnetic field with the coil 40. The interaction of the magnetic field produced by the coil 40 with the magnetic field produced by fixed magnet 42 produces a force which moves the coil 40 and thus the mirror assembly 20. The flexures 12, 14 support the mirror assembly 20 storing and applying a return force when the mirror assembly 20 is moved from the at-rest condition.

Requirements for resonant motor driver, such as those used to dither a mirror and/or laser in a bar code scanner include high efficiency, low cost, and constant predictable scan angle insensitive to thermal variations, orientation with respect to gravitational force, and mechanical shock. In a first preferred embodiment, a velocity feedback signal is derived from the back-EMF of the actuator motor coil 40 itself. Alternately, the position or velocity feedback may be derived from a Hall Effect device or a feedback coil mounted adjacent to a moving magnet (these elements shown diagrammatically in FIG. 4 as magnet 50 and feedback coil or Hall sensor device 52), a feedback coil mounted adjacent a moving magnet (element 108 and 105 in FIG. 1), a piezoelectric element or strain gage attached to the flexure 12 or 14, or some other suitable mechanism. The motor may employ a fixed coil 106 and a moving magnet 104 (as in FIG. 1), or a moving coil 40 and a fixed magnet 42 (as in FIGS. 3–4). Alternately, the motor may comprise a fixed coil and a moving coil. Coil drive is preferably provided by a unipolar or bipolar current source; this drive provides constant motor force regardless of thermal variation of coil resistance.

Figure 5:
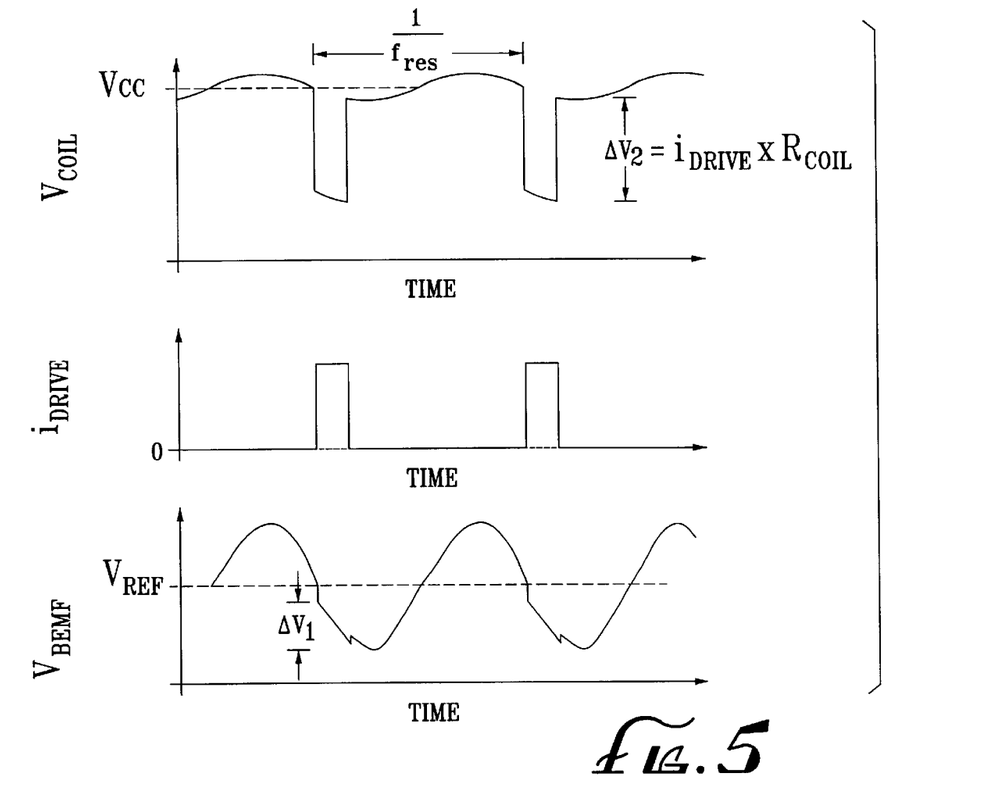
FIG. 5 is a graph of the actuator coil voltage and the drive current according to a preferred embodiment of the present invention.

Preferred control schemes will now be described with reference to FIGS. 5–7. A feedback signal indicative of velocity of the dither mechanism is monitored (a preferred means to derive such a waveform is described below), with the drive current ($i_{DRIVE}$) off, until a desired start point phase is detected, at which time drive current is applied (see FIG. 5). The start point corresponds to the zero velocity point in the preferred embodiment, though other start points may be implemented as will be described further below. It is noted that, in the embodiments illustrated in FIGS. 5–7, applying a drive current during the negative half-cycle of the velocity feedback waveform will aid motion, whereas applying a drive current during the positive half-cycle of the velocity feedback waveform will eventually bring the dither mechanism to a stop. Further, the drive pulse should preferably be applied during the time when the velocity feedback signal is approximately linear—not near the peaks. The optimum start point, then, offering maximum drive efficiency and maximum waveform linearity, is the zero velocity point. Another advantage of choosing the zero velocity point to start the drive process is that detection of this point may be easily and efficiently accomplished in hardware, freeing the microcontroller for other tasks during the time that the drive current is off.

After a settling period, the velocity feedback voltage is measured and stored. The velocity feedback voltage is measured periodically thereafter until it has changed (i.e. the amplitude has increased) by an amount $\Delta V_1$, at which time the drive current is turned off. Thus the drive current pulse $i_{DRIVE}$ is discontinued when the velocity of the scan mechanism has increased by a given amount $\Delta \omega$. The parameter $\Delta V_1$ may be determined empirically by trial and error, and is adjusted once during manufacture/assembly at the factory to yield a desired scan angle and stored in non-volatile memory, for use in succeeding scans. During manufacture, the parameter $\Delta V_1$ is preset to an initial setting (e.g. one which has been previously determined on other scan modules, or if no amount is previously known, to about 10% of the voltage corresponding to the peak velocity (amplitude) of the scan motor) and then adjusted up or down until a desired scan angle is achieved.

A significant advantage to setting the $\Delta V_1$, parameter to a given amount is that the scan angle remains constant in the presence of changes in temperature, orientation, mechanical shock, external magnetic fields, etc. External (relative to the drive function) scan angle control loops require significantly more hardware to implement, adding to cost, size and complexity, while making the drive pulse duration controlled by changes in the velocity feedback voltage provides inherent scan control and requires no additional hardware.

First application example: As temperature changes, both the coil resistance and the magnetic flux density also change. Typically, as temperature increases, the coil resistance increases and the magnetic flux density either increases or decreases depending upon the magnetic material. The drive torque may be made independent of coil resistance by driving the coil with a controlled current, since:

(i) Torque=$N*1*(i_{COIL} \times B)$ where N is the number of coil turns, 1 is the length of the coil windings within the field having flux density B, and $i_{COIL}$ is the coil current. Coil resistance changes have no effect on the back-EMF voltage used for velocity feedback, since:

(ii) $V_{BEMF}=N*d\phi/dt$ where $d\phi/dt$ is the change in flux with respect to time. The reduction in flux density will cause a proportional reduction in back-EMF amplitude for a given scan angle, however (from (ii)), but this reduction is accompanied by a proportional reduction in drive torque (from (i)) and thus acceleration α, since:

α≅Torque/J where J is the rotational moment of inertia (assumes that friction and damping are negligible, which is typically true for resonant motors). Thus, since drive current is applied until the velocity feedback voltage has changed by $\Delta V_1$, the duration of the drive pulse increases such that the actual scan angle is unaffected.

Second application example: External torque is applied to the resonant structure—due perhaps to mechanical shock or to changes in orientation (which would translate to an applied torque if the centers of rotation and gravity are different). If the external torque is in a direction to aid the drive, then velocity (and thus the back-EMF voltage) will change at a greater rate. A change of $\Delta V_1$, occurs sooner, thus the drive pulse width decreases to compensate for the aiding torque. In the case of an opposing external torque, it can similarly be shown that the drive pulse width increases.

Two difficulties occur in implementing the above method: First, the coil voltage exceeds the supply rails, making it difficult to measure in a single supply system; and second, the change in coil voltage due to drive current ($\Delta V_2$) is generally much larger than the peak amplitude of the BEMF signal, so accurate control of $\Delta V_1$ requires that an A/D converter with high resolution and large dynamic range be used. The coil voltage is approximately given by:

$v_{COIL} \cong (i_{DRIVE}*R_{COIL})+(K_E*\omega)$ where $v_{COIL}$ is the coil voltage, $i_{DRIVE}$ is the drive current, $R_{COIL}$ is the coil resistance, $K_E$ is the back-EMF constant of the motor, and ω is the motor velocity. The magnitude of the first term, which contains no velocity information, is typically much greater than that of the second term which contains the desired velocity information.

Figure 6:
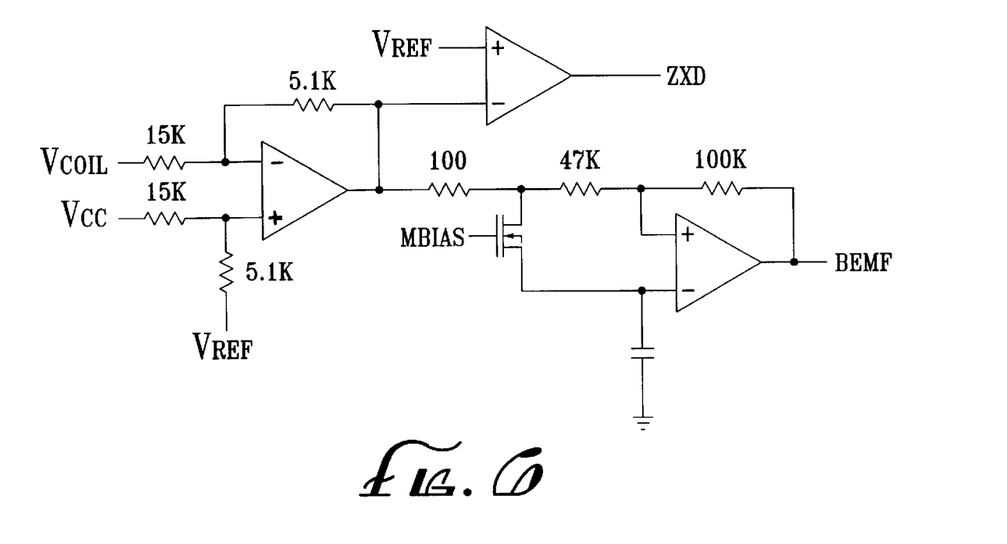
FIG. 6 is a schematic of a preferred discriminator circuit for deriving the back-EMF induced in the actuator coil from the coil voltage.
Figure 7:
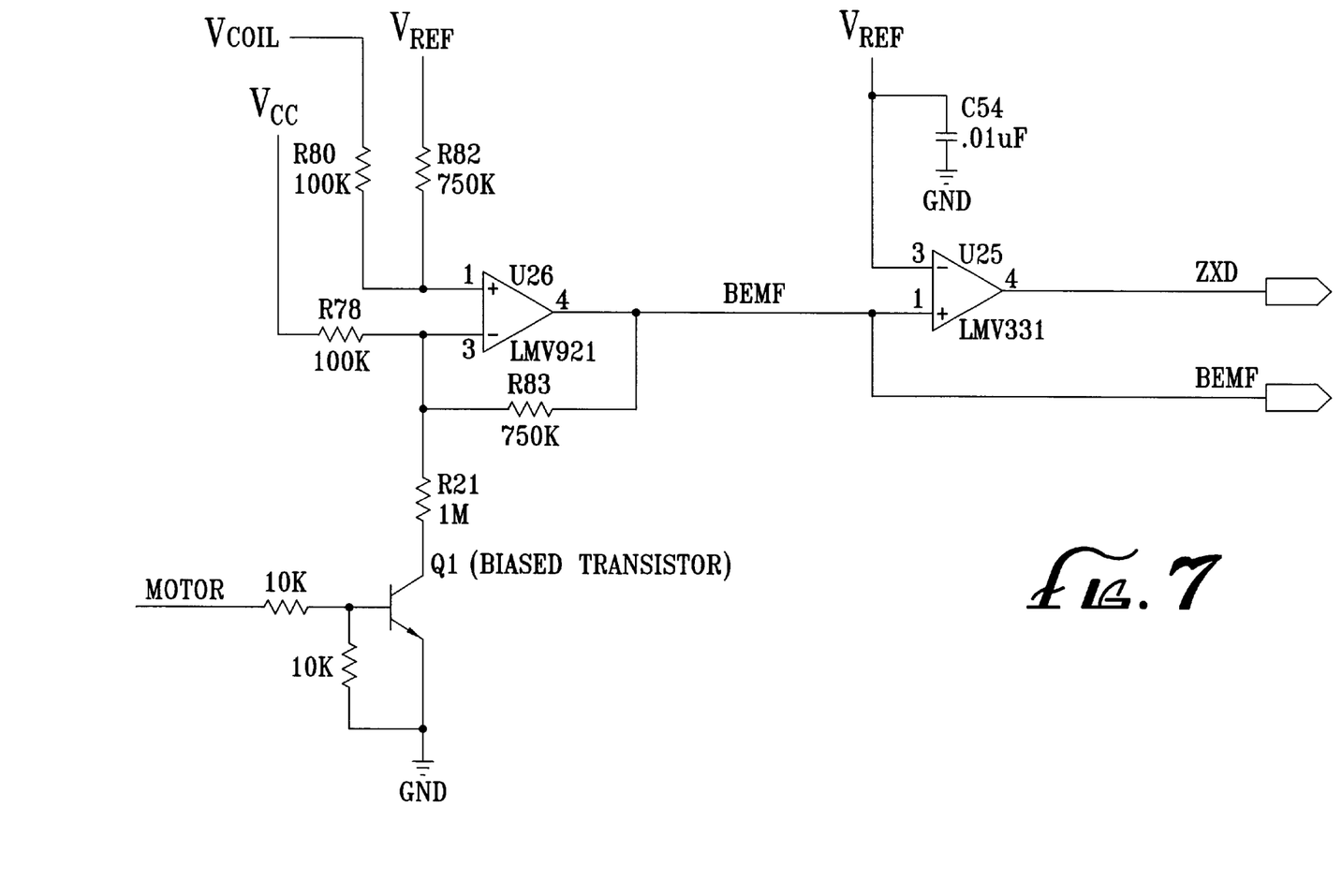
FIG. 7 is a schematic of an alternate back-EMF discriminator circuit.

To address these difficulties, a back-EMF discriminator such as one of the discriminators shown in FIGS. 6–7 may be used. In FIG. 6, this circuit is reset to the reference voltage $V_{REF}$ immediately following each change in the drive current state (dictated by MOTOR) by the signal MBIAS. The discriminator effectively functions to attenuate the first term above but provide gain to the second term. The result is a signal which can be easily monitored with a low-cost A/D converter (such as those found in low-cost microcontrollers) operating on the same supply as the motor driver itself. A comparator generates the output ZXD, indicating the point of zero velocity.

Another back-EMF discriminator design is shown in FIG. 7. In this embodiment, the sample-and-hold circuit is replaced with a circuit (Q1 and R21 in FIG. 7) which compensates for the offset in the BEMF signal which would otherwise be induced by the motor current, only during the time which motor current is applied. Without this compensation, the offset in BEMF due to the coil drive current is given by:

$V_{OFFSET}=i_{COIL}*R_{COIL}*(R82/R80)$

The value of R21 is therefore chosen to provide an equal offset to the BEMF output in the opposite (positive in this case) direction. This offset is only needed when the coil current is applied, so the MOTOR signal (which controls the coil current) is also used to control the application of the compensating offset.

Figure 8:
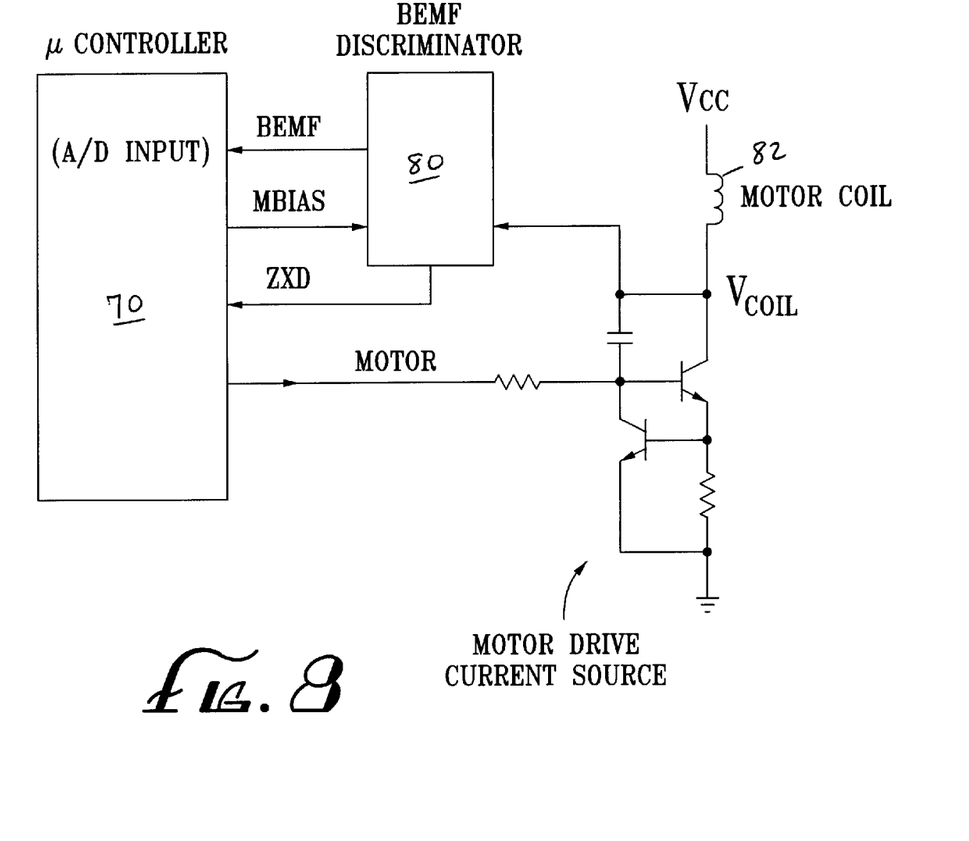
FIG. 8 is a schematic of the complete motor drive system according to a preferred embodiment, including the back-EMF discriminator, a unipolar drive current source, and a microcontroller for implementing the control algorithm.

A preferred complete driver circuit is shown in FIG. 8 which operates as follows. The microcontroller 70 includes an A/D converter for converting the BEMF signal into digital form. The microcontroller 70 implements the ΔV algorithm: upon a negative-going transition of the ZXD signal (1) the MOTOR signal is asserted applying drive current to the drive coil 82, (2) the discriminator 80 is reset via MBIAS (if used, MBIAS being asserted momentarily (MBIAS is de-asserted after a settling period) which sets the BEMF signal to approximately $V_{REF}$), (3) the initial BEMF voltage is converted and stored, (4) then successive samples are taken of the BEMF signal until it has changed by an amount $\Delta V_1$ relative to the initial BEMF voltage value, at which time MOTOR is de-asserted.

All of the above signals are inputs or outputs to the microcontroller 70. It is noted that the signal MBIAS is only required if the discriminator 80 used is of the design as shown in FIG. 6. The discriminator 80 and the comparator may be implemented in the microcontroller 70, but are preferably implemented external. The discriminator 80 is preferably implemented external to the microcontroller because the coil voltage is generally out of range and too small to be converted directly. The comparator is preferably implemented external to the microcontroller to keep the microcontroller free to do other tasks while waiting for the ZXD interrupt.

The phase at which the drive current is applied is important. In this embodiment, if the drive current is applied during the negative half-cycle it will aid drive motion; if it is applied during the positive half-cycle it will tend to reduce motion (in fact, this is an effective means for braking the mechanism). In general, oscillatory motion will be aided whenever the drive current is applied in a direction such that the back-EMF voltage is increased. Thus, in this embodiment, the best efficiency is obtained by initiating the drive pulse on negative-going edges of ZXD. This approach also removes the burden of finding the start point from the microcontroller, freeing it to tend to other tasks. This method results in a drive frequency which exactly matches the resonant frequency of the motor.

A start point prior to the velocity zero crossing is also possible. A start point somewhat prior to the velocity zero crossing causes a slight mismatch between the drive and resonant frequencies, and effectively lowers the Q of the motor, which may nonetheless be useful if rapid changes in scan angle are required. However, this lowering of Q is achieved at the cost of efficiency, since during the first part of the drive cycle the current is acting to reduce scan motion. The closer to the velocity zero crossing, the more efficient the motor. It may be useful to precede the zero velocity point by 5–10% of the negative to positive peak to peak $V_{BEMF}$, or 5–10% of the peak velocity (amplitude) of the scan motor.

Regardless of the implementation chosen, it is necessary to limit the maximum time that the MOTOR signal can be true (i.e. high) because the back-EMF may be too low to ever exceed $\Delta V_1$, and if MOTOR is left true the ditherer will eventually stop. If MOTOR is asserted at the zero velocity point, for example, then an appropriate time limit for the drive current pulse would be:

$$t_{LIMIT}=1/(2* f_{RES})$$

where $f_{RES}$ is the natural resonant frequency of the ditherer.

This general control scheme may also be used with the other velocity feedback means described previously. For example, if a separate feedback coil were available, such as coil 52 and magnet 50 of FIG. 4, then the BEMF signal could be taken directly from the coil, and no BEMF discriminator would be required. In this case, the application of the described control algorithm will also provide the aforementioned benefit of inherent scan angle control.

A suitable compact scan module mounted on a chassis or printed circuit board incorporating the scan engine configurations above may be conveniently disposed within the head of a handheld or fixed scanner housing. Alternately, the housing may be mounted into an application device such as, for example, a portable data terminal (not shown). The housing may be formed of plastic.

The light source in any of these embodiments may comprise any suitable source such as: lasers, laser diodes, coherent light sources, light emitting diodes, non-coherent light sources, and combinations thereof. The feedback system and methods may be applied to any suitable scanning mechanisms such as: dithering or oscillating mirror; dithering/oscillating light source or laser diode; dithering/oscillating prisms, holographic elements and others devices.

The control scheme may also be implemented to apply drive pulses in both directions, a first pulse being applied in a first direction starting at the zero velocity point, and a second pulse applied in the second direction when the scan mechanism passes the zero velocity point while moving in the other direction.

The above described dithering assembly provides for a compact structure and the dithering assembly may further include additional drive mechanism(s) to produce multiple scan lines for creating a more complex scan pattern such as for example, an asterisk pattern. Such a complex pattern generation system is described in U.S. Pat. No. 5,874,722 herein incorporated by reference. Depending upon the application, other scan mechanisms may be used in the module such as for example the other dithering mechanisms disclosed in U.S. Pat. No. 5,874,722, and in combination with rotating polygon mirrors or holographic elements, particularly for generating multiple scan lines.

While embodiments, applications, and certain advantages of the present invention have been shown and described, it would be apparent to one skilled in the art that other modifications are possible without departing from the inventive concepts herein. The invention, therefore, is not to be restricted except in the spirit of the claims that follow.

What is claimed is:

1. A method of driving a resonant scan mechanism, the scan mechanism including a spring-mounted dither element and a drive motor driven by a drive current, comprising the steps of dithering the spring-mounted dither element over a scan cycle by applying a drive current pulse at spaced intervals;

determining velocity of the scan mechanism;

selecting a start point for the drive current pulse corresponding to a zero velocity point for the velocity of the scan mechanism;

applying the drive current pulse at the start point;

discontinuing the drive current pulse within one quarter of a scan cycle when the velocity of the scan mechanism has increased to a predetermined velocity over zero velocity and below peak motor velocity.

2. A method according to claim 1 wherein the step of determining velocity of the scan mechanism comprises deriving a velocity signal from a Hall Effect device positioned adjacent a moving magnet on the dither element.

3. A method according to claim 1 wherein the step of determining velocity of the scan mechanism comprises measuring a back-EMF voltage on a drive coil of the drive motor.

4. A method according to claim 3 further comprising
applying the drive current pulse only during a half-cycle of a velocity feedback waveform of the drive motor during which said drive current pulse aids motion of said resonant scan mechanism.

5. A method according to claim 1 further comprising applying only one drive current pulse per scan cycle.

6. A method according to claim 1 further comprising applying two opposite polarity drive current pulses per scan cycle whereby the dither element is driven in two directions.

7. A method according to claim 1 further comprising
applying the drive current pulse during a half-cycle of a velocity feedback waveform of the drive motor during which said drive current pulse aids motion of said resonant scan mechanism.

8. A method according to claim 1 wherein the step of determining velocity of the scan mechanism comprises periodically measuring the velocity.

9. A method of driving a resonant scan mechanism, the scan mechanism including a spring-mounted dither element and a drive motor driven by a drive current, comprising the steps of dithering the spring-mounted dither element by applying a drive current pulse at spaced intervals;

determining velocity of the scan mechanism;

selecting a start point for the drive current pulse corresponding to a zero velocity point for the velocity of the scan mechanism;

applying the drive current pulse at the start point;

discontinuing the drive current pulse when the velocity of the scan mechanism has changed by a given amount, wherein the step of determining velocity of the scan mechanism comprises measuring a back-EMF voltage on a drive coil of the drive motor, wherein the step of discontinuing the drive current pulse comprises discontinuing when change in the back-EMF voltage exceeds a given amount $\Delta V_1$.

10. A method according to claim 5 further comprising using a discriminator circuit and resetting the discriminator circuit following each change in drive current state for attenuating the drive current pulse from the voltage on the drive coil.

11. A method according to claim 5 further comprising applying a discriminator to the drive coil voltage to attenuate change in voltage on the drive coil due to the drive current pulse.

12. A method according to claim 9 further comprising selecting the given amount $\Delta v_1$ by adjusting the value of $\Delta V_1$ to achieve a desired scan length.

13. A scan drive mechanism comprising
a spring-mounted dither element;
a magnetic drive motor including a drive coil for driving the dither element in an oscillatory manner over a scan cycle;
a drive circuit for (a) applying a drive current pulse to the drive coil at a given start point near a zero velocity point of the drive motor and (b) discontinuing the drive current pulse within one quarter of a scan cycle once velocity of the drive motor has increased to a given velocity over zero velocity and below peak motor velocity.

14. A scan drive mechanism according to claim 13 further comprising
means for measuring the velocity of the drive motor.

15. A scan drive mechanism according to claim 14 wherein the means for measuring velocity of the drive motor comprises means for measuring a back-EMF voltage signal of the drive coil.

16. A scan drive mechanism according to claim 15 further comprising
a discriminator for attenuating the drive current pulse from drive coil voltage;
a comparator for determining a zero crossing for a velocity waveform of the back-EMF signal.

17. A scan drive mechanism according to claim 16 further comprising a microcontroller containing the discriminator circuit and the comparator.

18. A scan drive mechanism according to claim 14 wherein the means for measuring velocity comprises a feedback magnet disposed on the dither element and a fixed feedback coil disposed adjacent the feedback magnet.

19. A scan drive mechanism according to claim 14 wherein the means for measuring velocity comprises a Hall Effect sensor for sensing movement of the dither element.

20. A scan drive mechanism according to claim 14 wherein the means for measuring velocity comprises a moving feedback coil and a fixed feedback magnet disposed adjacent the feedback coil.

21. A scan drive mechanism according to claim 20 wherein the drive coil comprises the feedback coil.

22. A scan drive mechanism according to claim 13 further comprising
means for periodically measuring velocity of the scan mechanism over a scan cycle.

23. A scan drive mechanism comprising
a spring-mounted dither element;
a magnetic drive motor including a drive coil for driving the dither element in an oscillatory manner;
a drive circuit for (a) applying a drive current pulse to the drive coil at a given start point near a zero velocity point of the drive motor and (b) discontinuing the drive current pulse once velocity of the drive motor is determined to have increased by a given amount,
wherein the given start point precedes a zero velocity point by no more than 10% of a peak velocity of the drive motor.

24. A method of driving a scan mechanism, the scan mechanism including a spring-mounted dither element and a drive motor driven by a drive current, comprising the steps of
dithering the spring-mounted dither element over a scan cycle by applying a drive current pulse;
determining velocity of the scan mechanism;
selecting a start point for the drive current pulse corresponding a point near where the scan mechanism is at zero velocity;
applying the drive current pulse at the start point;
discontinuing the drive current pulse within one quarter of a scan cycle when the velocity of the scan mechanism has increased to a predetermined velocity over zero velocity and below peak motor velocity.

25. A method according to claim 24 further comprising selecting the start point for the drive current pulse at the zero velocity point.

26. A method according to claim 24 wherein the step of determining velocity of the scan mechanism comprises periodically measuring the velocity.

27. A method of driving a scan mechanism, the scan mechanism including a spring-mounted dither element and a drive motor driven by a drive current, comprising the steps of
dithering the spring-mounted dither element by applying a drive current pulse;
determining velocity of the scan mechanism;
selecting a start point for the drive current pulse corresponding a point near where the scan mechanism is at zero velocity;
applying the drive current pulse at the start point;
discontinuing the drive current pulse when the velocity of the scan mechanism has changed by a given amount;
selecting the start point for the drive current pulse at a point preceding the zero velocity point by no more than 10% of a peak velocity of the drive motor.

28. A method of driving a scan mechanism, the scan mechanism including a spring-mounted dither element and a drive motor driven by a drive current, comprising the steps of
periodically applying once per dither cycle a first drive current pulse to drive the drive motor in one direction;
monitoring velocity of the scan mechanism over the dither cycle;
selecting a start point for the first drive current pulse near a zero velocity point and commencing the first drive current pulse at the start point;
controlling scan angle over which the scan mechanism dithers by discontinuing the first drive current pulse within one quarter of a scan cycle when the velocity of the scan mechanism has increased to a predetermined velocity which is greater than zero velocity and below peak motor velocity.

29. A method according to claim 28 further comprising applying only a single drive current pulse per dither cycle of the scan mechanism.

30. A method according to claim 28 further comprising applying a second drive current pulse of opposite polarity once per dither cycle to drive the dither element in an opposite direction, whereby the dither element is driven in two directions.

31. A method according to claim 28 wherein the step of monitoring velocity of the scan mechanism comprises deriving a velocity signal from a Hall Effect device positioned adjacent a moving magnet on the dither element.

32. A method according to claim 28 wherein the step of monitoring velocity of the scan mechanism comprises measuring a back-EMF voltage on a drive coil of the drive motor.

33. A method according to any of claims 1, 24 or 28 wherein the step of discontinuing the drive current pulse comprises discontinuing the drive current pulse when a first one of the following conditions has occurred: (1) when the velocity of the scan mechanism exceeds the predetermined velocity and (2) when a time duration of the drive current pulse has reached a predetermined time limit.

34. A method according to claim 33 wherein the predetermined time limit is equal to $1/(21 * f_{RES})$, where $f_{RES}1$ is the natural resonant frequency of the scan mechanism.

35. A method of driving a scan mechanism, the scan mechanism including a spring-mounted dither element and a drive motor driven by a drive current, comprising the steps of periodically applying once per dither cycle a first drive current pulse to drive the drive motor in one direction;

monitoring velocity of the scan mechanism over the dither cycle;

selecting a start point for the first drive current pulse near a zero velocity point and commencing the first drive current pulse at the start point;

controlling scan angle over which the scan mechanism dithers by discontinuing the drive pulse when the velocity of the scan mechanism has increased to a predetermined velocity which is greater than zero velocity and below peak motor velocity;

selecting an initial setting for the predetermined velocity corresponding to an arbitrary velocity setting and then adjusting the predetermined velocity up or down until a desired scan angle is achieved.

36. A method according to claim 35 wherein the given initial setting is about 10% of peak motor velocity.

37. A method according to claim 35 wherein the initial setting for the predetermined velocity is selected corresponding to a predetermined velocity previously determined for another scan mechanism.

38. A method according to claim 35 further comprising selecting the start point for the drive current pulse at a point preceding the zero velocity point by no more than 10% of peak motor velocity.

39. A method of driving a scan mechanism, the scan mechanism including a spring-mounted dither element and a drive motor driven by a drive current, comprising the steps of periodically applying once per dither cycle a first drive current pulse to drive the drive motor in one direction;

monitoring velocity of the scan mechanism over the dither cycle;

selecting a start point for the first drive current pulse near a zero velocity point and commencing the first drive current pulse at the start point;

controlling scan angle over which the scan mechanism dithers by discontinuing the drive pulse when the velocity of the scan mechanism has increased to a predetermined velocity which is greater than zero velocity and below peak motor velocity, wherein the step of discontinuing the drive current pulse comprises discontinuing when change in the back-EMF voltage exceeds a given amount $\Delta V_1$.

40. A method according to claim 39 further comprising using a discriminator circuit and resetting the discriminator circuit following-each change in drive current state for attenuating the drive current pulse from the voltage on the drive coil.

41. A method according to claim 39 further comprising applying a discriminator to the drive coil voltage to attenuate change in voltage on the drive coil due to the drive current pulse.

42. A method according to claim 39 further comprising selecting the given amount $\Delta V_1$ by adjusting the value of $\Delta V_1$ to achieve a desired scan length.

43. A method according to claim 39 wherein the step of monitoring velocity of the scan mechanism comprises periodically measuring the velocity.

* * * * *

UNITED STATES PATENT AND TRADEMARK OFFICE
CERTIFICATE OF CORRECTION

PATENT NO. : 6,547,145 B2
DATED : April 15, 2003
INVENTOR(S) : James E. Colley and Edward P. Coleman It is certified that error appears in the above-identified patent and that said Letters Patent is hereby corrected as shown below:

<u>Column 6,</u>
Line 11, the equation "$V_{OFFSET} = i_{COIL}*R_{COIL}*(R82/R80)$" should read -- $V_{OFFSET} = -i_{COIL}*R_{COIL}(R82/R80)$ --.

<u>Column 9,</u>
Line 2, "$\Delta v_1$" should read -- $\Delta V_1$ --.

<u>Column 11,</u>
Line 8, "$1/(21*f_{RES})$, where $f_{RES}1$ is" should read -- $1/(2*f_{RES})$, where $f_{RES}$ is --.

Signed and Sealed this

Sixteenth Day of March, 2004

JON W. DUDAS
*Acting Director of the United States Patent and Trademark Office*